(12) United States Patent
Vallette et al.

(10) Patent No.: US 9,194,409 B2
(45) Date of Patent: Nov. 24, 2015

(54) DISCONNECT DEVICE

(71) Applicant: Thomas & Betts International, Inc., Wilmington, DE (US)

(72) Inventors: Ronald Vallette, Ormond Beach, FL (US); James L. Zahnen, Ormond Beach, FL (US); Matthew D. Cawood, Deleon Springs, FL (US)

(73) Assignee: Thomas & Betts International, Inc., Wilmington, DE (US)

( * ) Notice: Subject to any disclaimer, the term of this patent is extended or adjusted under 35 U.S.C. 154(b) by 527 days.

(21) Appl. No.: 13/711,726

(22) Filed: Dec. 12, 2012

(65) Prior Publication Data

US 2013/0174405 A1   Jul. 11, 2013

Related U.S. Application Data

(60) Provisional application No. 61/584,360, filed on Jan. 9, 2012.

(51) Int. Cl.
| | |
|---|---|
| *F16B 7/18* | (2006.01) |
| *B23P 11/00* | (2006.01) |
| *H01R 43/26* | (2006.01) |
| *H01R 4/50* | (2006.01) |

(52) U.S. Cl.
CPC ............... *F16B 7/182* (2013.01); *B23P 11/00* (2013.01); *H01R 43/26* (2013.01); *H01R 4/5083* (2013.01); *Y10T 29/49826* (2015.01); *Y10T 29/49945* (2015.01); *Y10T 29/49947* (2015.01); *Y10T 403/68* (2015.01)

(58) Field of Classification Search
CPC ...... H01R 43/26; H01R 4/5083; B23P 11/00; Y10T 29/49945; Y10T 29/49947; Y10T 29/49826; Y10T 403/68
See application file for complete search history.

(56) References Cited

U.S. PATENT DOCUMENTS

| | | | |
|---|---|---|---|
| 5,357,666 A | 10/1994 | El Dessouky et al. | |
| 5,533,254 A * | 7/1996 | Gallo et al. | ............... 29/750 |
| 5,605,382 A * | 2/1997 | Massa | ............... 299/107 |
| 6,196,045 B1 | 3/2001 | Thomas et al. | |
| 6,269,683 B1 | 8/2001 | Gissler et al. | |
| 6,349,767 B2 | 2/2002 | Gissler | |
| 6,449,822 B1 | 9/2002 | Gilbert et al. | |
| 6,622,363 B2 | 9/2003 | Komsta | |
| 6,712,146 B2 | 3/2004 | Estep et al. | |
| 6,786,116 B2 | 9/2004 | Dockery | |
| 6,834,524 B2 | 12/2004 | Johnston | |
| 6,990,843 B2 | 1/2006 | Frenken | |
| 7,114,824 B2 | 10/2006 | Picone | |
| 7,241,084 B2 | 7/2007 | Hutton et al. | |

(Continued)

*Primary Examiner* — John C Hong
(74) *Attorney, Agent, or Firm* — Snyder, Clark, Lesch & Chung, LLP

(57) ABSTRACT

A disconnect assembly includes a head coupler portion and a tool coupler portion. The head coupler portion includes: a threaded portion on a first part of an exterior surface to connect to a wedge frame, a longitudinal bore, a rod configured to slide longitudinally within the longitudinal bore, and a set of annular protrusions on a second part of the exterior surface. The tool coupler portion includes: a threaded bore configured to mechanically attach the tool coupler portion to the tool, and a channel to receive a head coupler portion. The channel includes a set of grooves corresponding to the set of annular protrusions on the head coupler portion. When the head coupler portion is connected to the tool coupler portion, a ram from the hydraulic tool engages the rod to apply force to an object in the wedge frame.

20 Claims, 10 Drawing Sheets

(56) References Cited

U.S. PATENT DOCUMENTS

| | | |
|---|---|---|
| 7,284,928 B2 | 10/2007 | Perez et al. |
| 7,464,578 B2 | 12/2008 | Ayer et al. |
| 7,614,133 B2 * | 11/2009 | Candelieri et al. .............. 29/508 |
| 2004/0177495 A1 | 9/2004 | Itrich |
| 2007/0240301 A1 | 10/2007 | Johnson et al. |

* cited by examiner

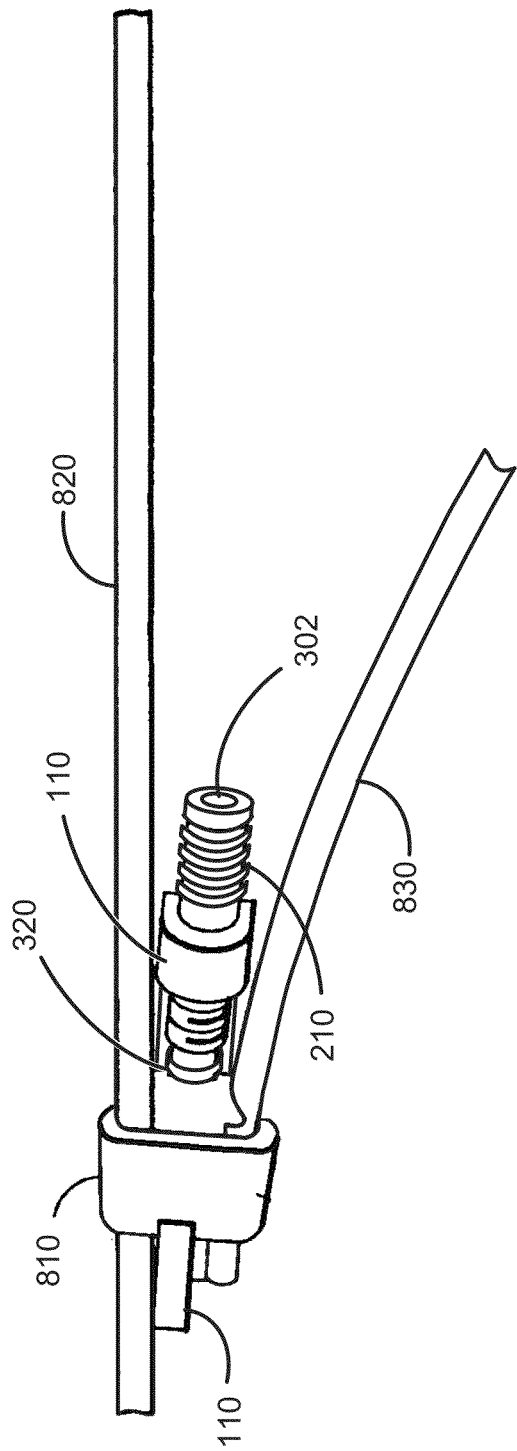

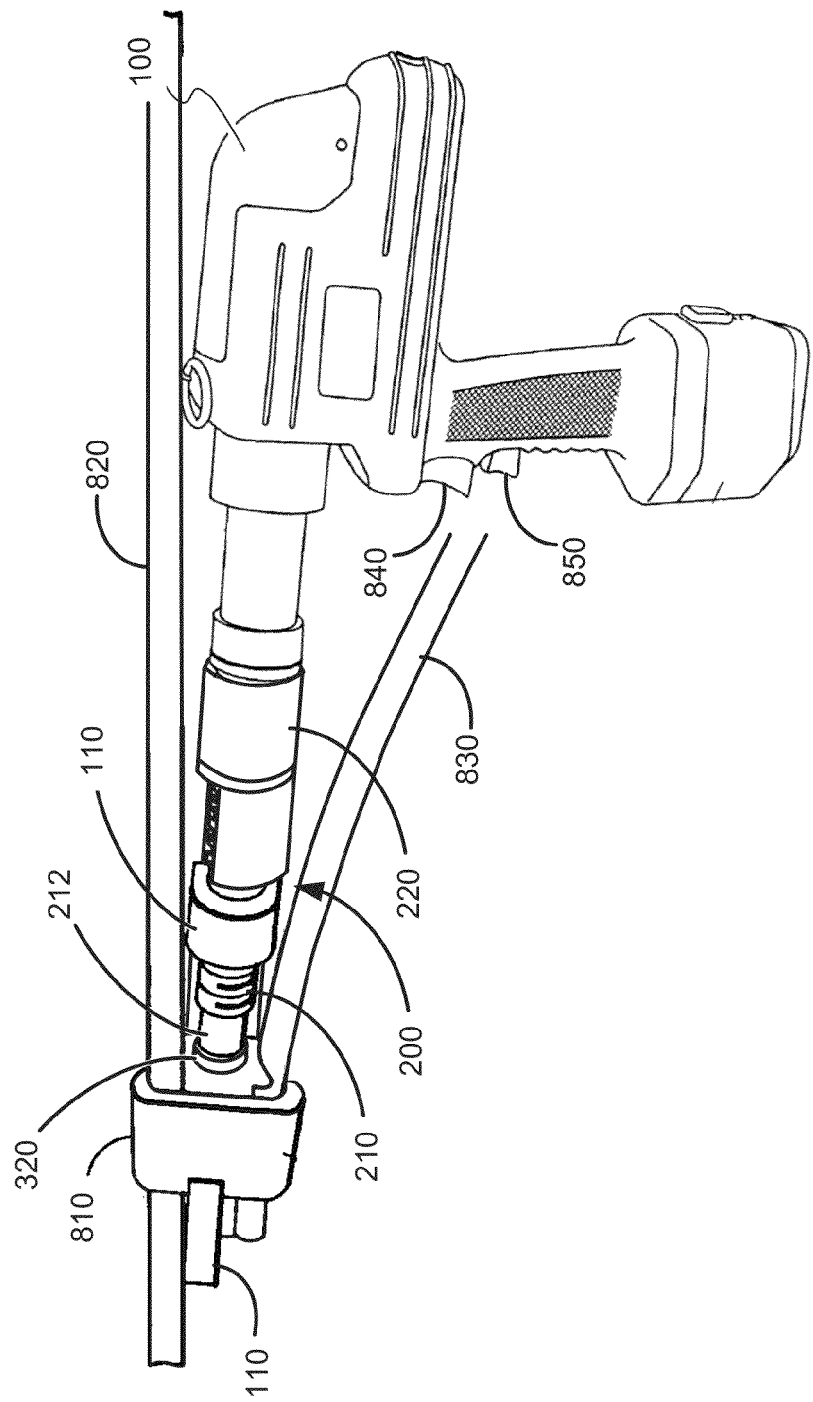

DISCONNECT DEVICE

RELATED APPLICATION

This application claims priority under 35 U.S.C. §119, based on U.S. Provisional Patent Application No. 61/584,360, filed Jan. 9, 2012, the disclosure of which is hereby incorporated by reference herein.

BACKGROUND INFORMATION

In electrical power systems it is occasionally necessary to tap into an electrical power line. One known system for tapping into an electrical power line is to use a tap connector for electrically connecting a mainline electrical cable to an end of a tap line electrical cable. One such tap connector, referred to as a wedge connector, includes a conductive C-shaped member and a wedge. To install the wedge connector, two cables are positioned at opposite sides of the C-shaped member and the wedge is driven between the two cables. Insertion of the wedge forces the two cables against the C-shaped member to provide a secure conductive contact.

Wedge connectors have conventionally been installed using explosively-driven connecting tools to drive the wedge. More recently, battery-operated hydraulic tools have been introduced to install wedge connectors.

BRIEF DESCRIPTION OF THE DRAWINGS

FIGS. 8A-8C provide isometric views of a wedge connector installation process according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
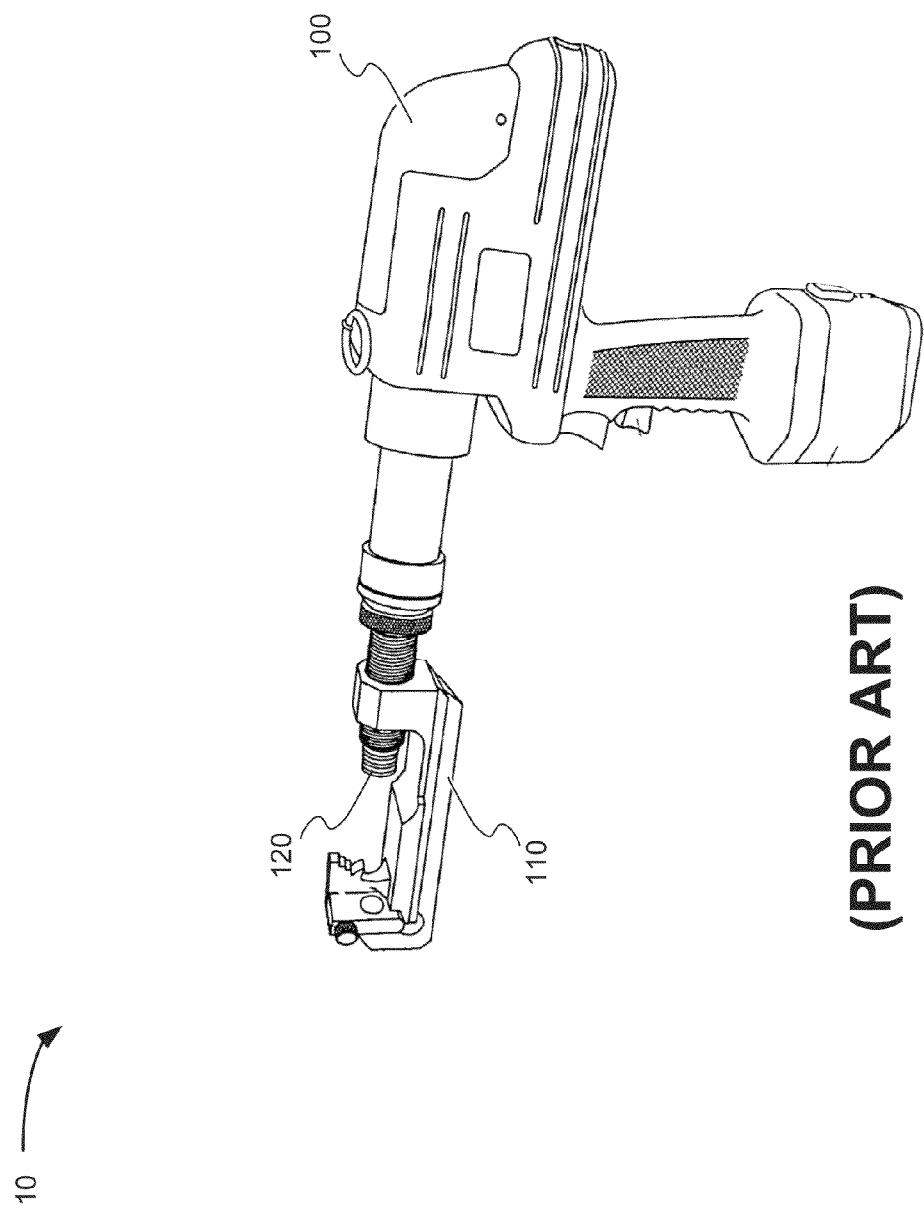
FIG. 1 provides an isometric view of a hydraulic tool in which apparatus and methods described herein may be implemented.

Battery-operated hydraulic tools for installing wedge connectors provide several advantages over explosively-driven tools. For example, use of the hydraulic tools may simplify or eliminate some safety, transport, and certification concerns associated with explosively-driven installation tools. However, the hydraulic tools create a unique set of challenges for users. For example, as shown in FIG. 1, a wedge installation tool 10 may include a hydraulic driver 100, an interchangeable wedge frame 110 (also referred to as a "head"), and a ram 120.

Wedge frame 110 may be a conventional tool head, such as a tool head used by manufactures for securing wedge connectors at relatively low (e.g., non-ballistic) ram velocities. Wedge frame 110 may be sized for different wedge connectors (e.g., depending on the thickness of mainline and tap electrical cables). Positioning of wedge frame 110 (e.g., to hold a wedge during installation) can be cumbersome due to the size or weight of hydraulic driver 100 and the fact that wedge frame 110 is screwed directly to hydraulic driver 100. Particularly, hydraulic driver 100 and wedge frame 110 must be maneuvered into position between the mainline and tap conductor, and then rotated to snug ram 120 against the wedge prior to activation of hydraulic driver 100 to advance ram 120.

Figure 2:
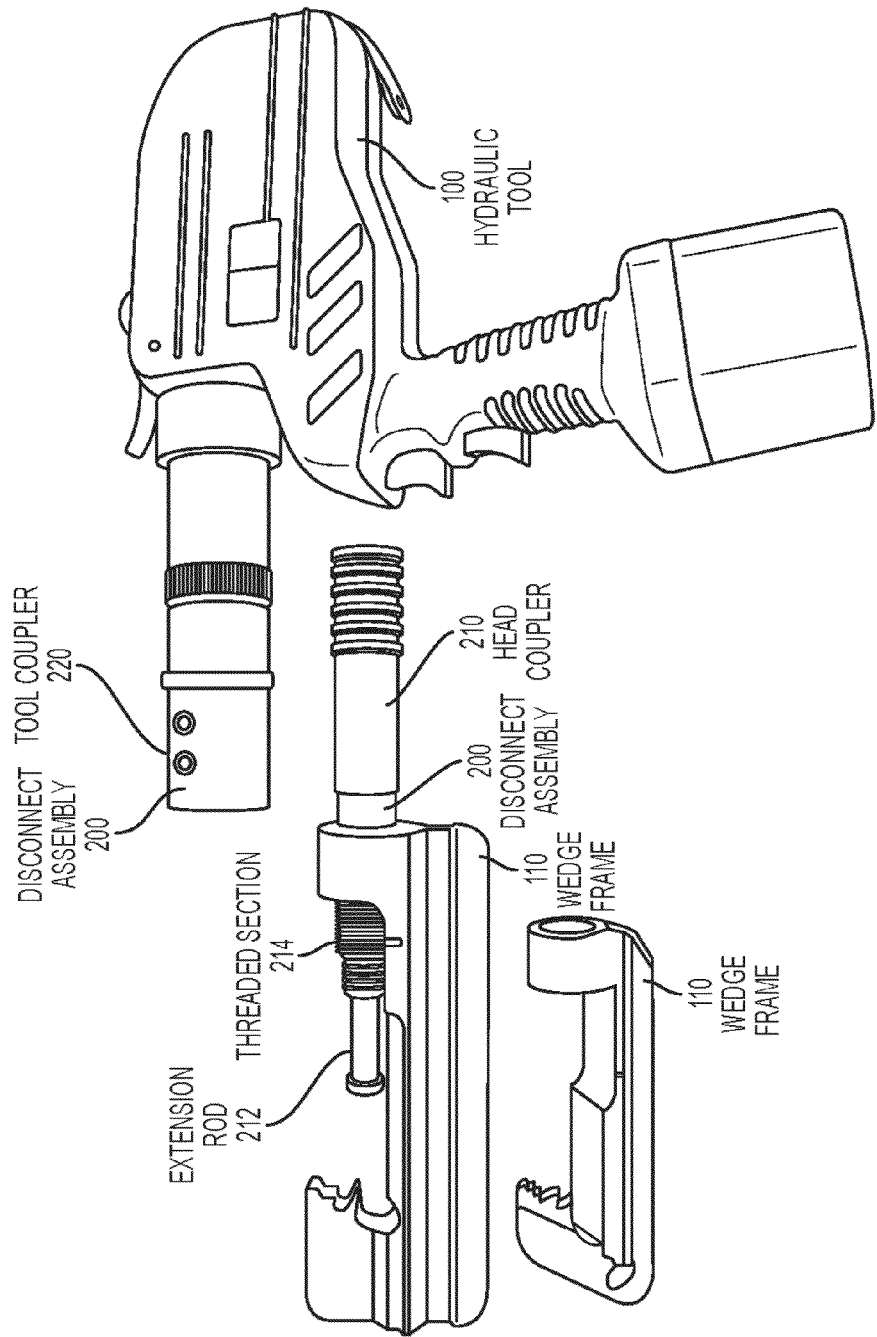
FIG. 2 provides a view of the hydraulic tool of FIG. 1 including a disconnect assembly according to an implementation described herein.

FIG. 2 provides a view of wedge installation tool 10 including a disconnect assembly 200 installed on wedge installation tool 10. According to an implementation described herein, disconnect assembly 200 is provided to allow wedge frame 110 to be positioned and snug against a wedge of a wedge connector prior to connecting wedge frame 110 to hydraulic driver 100. As shown in FIG. 2, disconnect assembly 200 may include a head coupler 210 and a tool coupler 220. Head coupler 210 may include an extension rod 212 and a threaded section 214 configured to receive one of wedge frames 110. Two wedge frames 110 are shown in FIG. 2, and either of the two wedge frames 110 may be interchangeably used with head coupler 210. As described further herein, tool coupler 220 may include a threaded section to connect to hydraulic driver 100 and a section to secure head coupler 210 to tool coupler 220. Head coupler 210 and tool coupler 220 may be generally be made from a metal alloy, such as SAE grade 4140 steel. Extension rod 212 may be made of a corrosion resistant metal, such as stainless steel.

Figure 3:
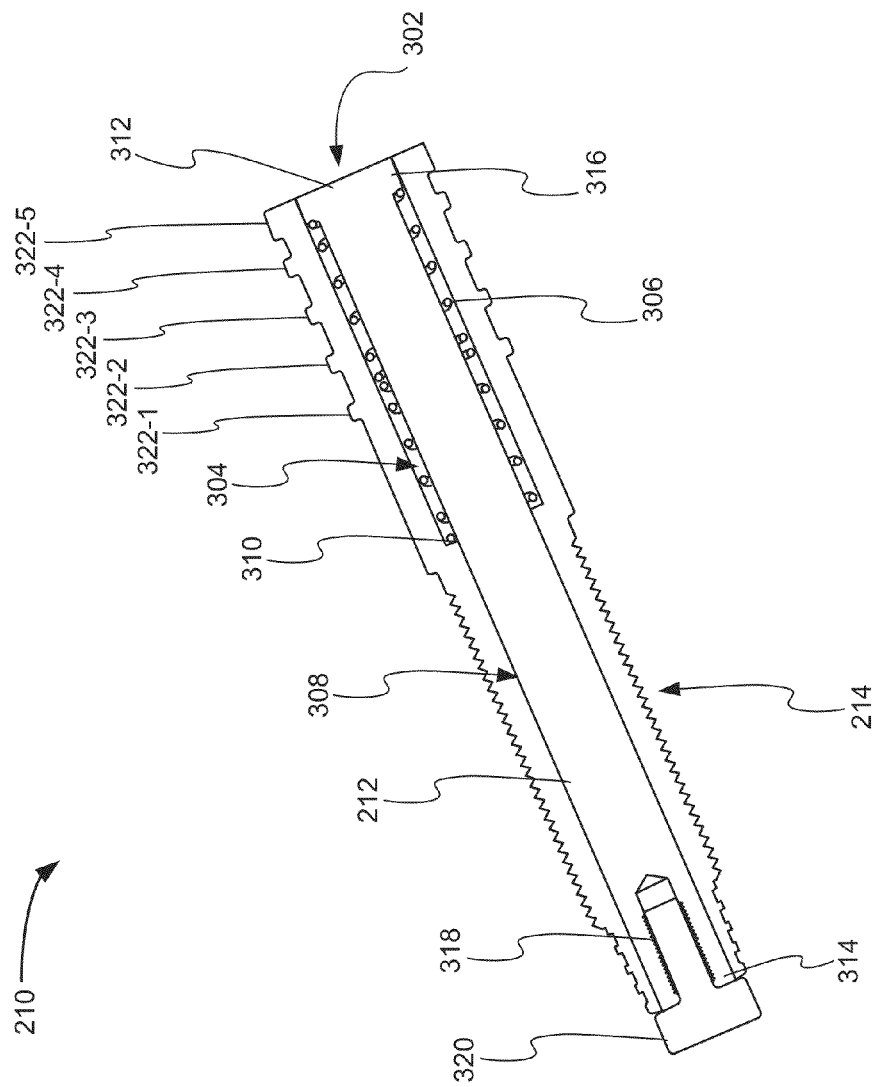
FIG. 3 provides a cross sectional view of a head coupler of the disconnect assembly of FIG. 2.

FIG. 3 provides a cross sectional view of an exemplary implementation of head coupler 210. Cross-sectional hatching is excluded from FIG. 3 for simplicity. As shown in FIG. 3, head coupler 210 may include extension rod 212 within a cylindrical bore 302 and threaded section 214. Cylindrical bore 302 may include a first portion 304 with a diameter configured to contain a spring 306 around the circumference of extension rod 212 and to receive ram 120 from hydraulic driver 100. Cylindrical bore 302 may include a second portion 308 with a smaller diameter to permit travel of extension rod 212 within cylindrical bore 302 with minimal clearance. A shoulder 310 may be formed at the interface of first portion 304 and second portion 308.

Extension rod 212 may include a cylindrical member to transfer force from ram 120 to a wedge. Forces transferred from ram 120 may be in the range of between three to eight tons. Extension rod 212 travels axially within cylindrical bore 302. Extension rod 212 may include a proximal end 312 to receive applied force from ram 120 and a distal end 314 that may extend out of cylindrical bore 302. Proximal end 312 may include a large diameter portion 316 (also referred to as support rim 316) that conforms generally (e.g., with an appropriate clearance) to the diameter of first portion 304 of cylindrical bore 302. Spring 306 may generally encircle a portion of extension rod 212 within first portion 304 of cylindrical bore 302. Spring 306 may provide a retention force (e.g., axially along cylindrical bore 302) to retain extension rod 212 within cylindrical bore 302. Spring 306 may be constrained between shoulder 310 of cylindrical bore 302 and support rim 316 of proximal end 312. The axial force of spring 306 may be much smaller than a force applied to extension rod 212 by ram 120. Upon application of force from ram 120, spring 306 may be compressed between shoulder 310 and support rim 316. Travel of extension rod 212 may be limited to the length of first portion 304 minus the length of compressed spring 306 when compressed between shoulder 310 and support rim 316.

Distal end 314 may include a threaded bore 318 to accommodate an end cap 320. For example, end cap 320 may be screwed into threaded bore 318. End cap 320 may include a diameter larger than the diameter of second portion 308 and approximately equal to an outer diameter of first portion 304 of cylindrical bore 302. Because end cap 320 has a larger diameter than second portion 308 of cylindrical bore 302, end cap 302 may limit axial travel of extension rod 212 in a direction toward large diameter portion 316 such that the proximal end 312 does not extend beyond the end of first portion 304 of cylindrical bore 302. An exposed surface of end cap 320 may engage another surface (e.g., a wedge) to apply force supplied by ram 120 on proximal end 312. In another implementation, end cap 320 may include a non-flat surface for to enable alternate functions for disconnect assembly 200 (e.g., functions other than forcing a wedge of a wedge connector). For example, in other embodiments, end cap 320 may include a cutting edge or a crimping surface.

Head coupler 210 may also include multiple annular protrusions 322-1 through 322-5 (also referred to herein as a "protrusion ring" or collectively as "protrusion rings 322") around a circumference of head coupler 210. Protrusion rings 322 may be configured to engage corresponding grooves (e.g., grooves 424, described below in connection with FIG. 4) of tool coupler 220 to restrict axial motion of head coupler 210 with respect to tool coupler 220. Thus, protrusion rings 322 may be load bearing against a reaction to a force applied by ram 120 and/or extension rod 212. Although five protrusion rings 322 are shown, in other implementations, more or fewer protrusion rings 322 may be used, depending, for example, upon the expected loads applied by hydraulic driver 100. In one implementation, one or more protrusion rings 322 and corresponding grooves 424 may be of different sizes (e.g., mechanically indexed) to prevent partial insertion or misalignment of head coupler 210 within tool coupler 220. For example, as shown in FIG. 3, protrusion ring 322-5 may have a wider surface than any of protrusion rings 322-1 through 322-4. In one implementation, the section of head coupler 210 encircled by protrusion rings 322 may be cylindrical to allow insertion of head coupler 210 into tool coupler 220 in any rotational orientation around the axis of the longitudinal bore 302.

Figure 4:
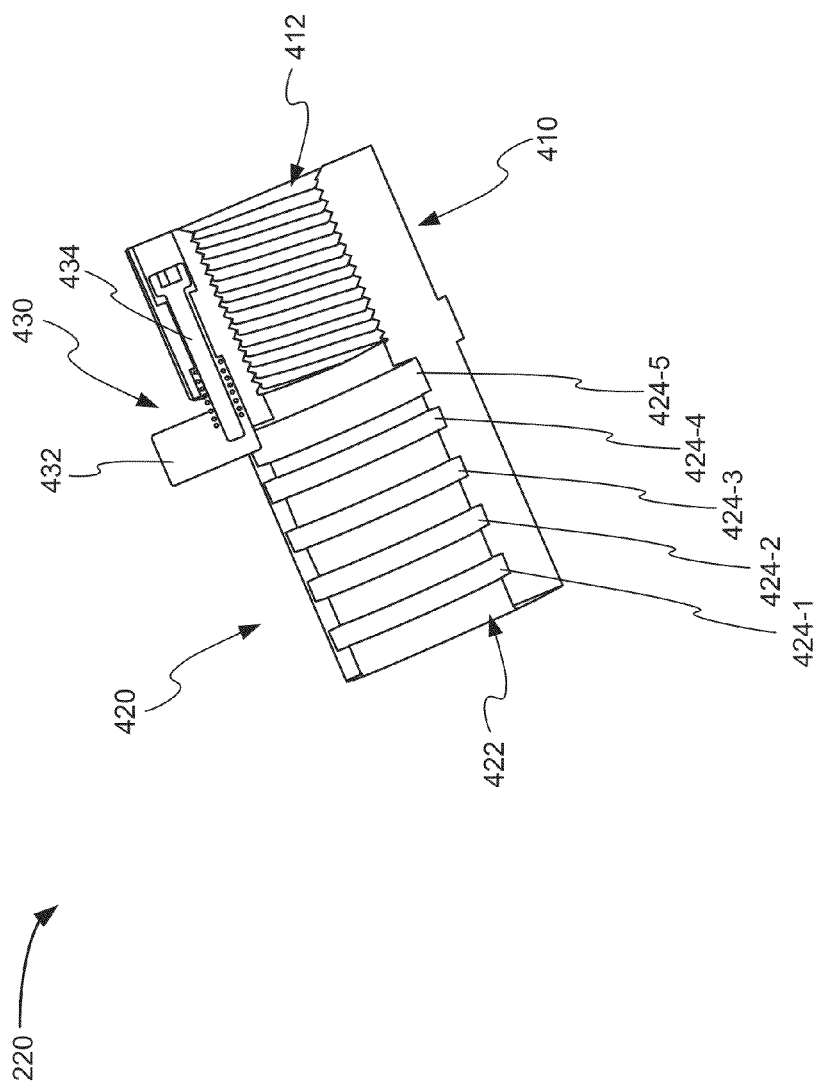
FIG. 4 provides a cross sectional view of a tool coupler of the disconnect assembly of FIG. 2.

FIG. 4 provides a cross sectional view of tool coupler 220 according to an implementation described herein. Cross-sectional hatching is excluded from FIG. 4 for simplicity. As shown in FIG. 4, tool coupler 220 may include a tool engagement section 410, a head engagement section 420, and a retention system 430. Tool engagement section 410 may include a threaded bore 412 to connect to hydraulic driver 100. Threaded bore 412 may be sized to match the diameter and threads of wedge frame 110, such that tool coupler 220 may be threaded onto hydraulic driver 100 in place of wedge frame 110.

Head engagement section 420 may include a U-shaped channel 422. U-shaped channel 422 may include multiple grooves 424-1 through 424-5 (referred to collectively herein as "grooves 424") and may be sized to receive head coupler 210 with multiple protrusion rings 322-1 through 322-5. Grooves 424 may be configured to engage corresponding protrusion rings 322 of head coupler 210 (e.g., when head coupler 210 is connected to tool coupler 220) to restrict axial motion of head coupler 210 with respect to tool coupler 220.

In one implementation, one or more grooves 324 and corresponding protrusion rings 322 may be of different sizes (e.g., mechanically indexed) to prevent partial insertion or misalignment of head coupler 210 within tool coupler 220. For example, as shown in FIG. 3, grooves 424-5 may have a wider surface than any of grooves 424-1 through 424-4.

Retention system 430 may include a mechanism to lock head coupler 210 within tool coupler 220. In one implementation, a spring-loaded latch 432 may allow insertion of head coupler 210 into tool coupler 220 and snap into place over head coupler 210 after head coupler 210 is fully inserted within tool coupler 220. Thus, retention system 430 may provide an automatic or "hands-free" mechanism to secure head coupler 210 in tool coupler 220 and keep cylindrical bore 302 aligned with threaded bore 412. After head coupler 210 has been inserted in tool coupler 220 and spring-loaded latch 432 has snapped into a securing position, a spring-loaded pin 434 may secure spring-loaded latch 432 in place to prevent head coupler 210 from forcing off spring-loaded latch 432. Spring-loaded pin 434 may be manually disengaged from spring-loaded latch 432 to allow spring-loaded latch 432 to lift up and release head coupler 210 from tool coupler 220. Thus, manual (e.g., operator) intervention may be required to disengage retention system 430.

In another implementation, retention system 430 may include a different locking system, such as one or more retention pins that may be inserted transversely across a portion of U-shaped channel 422 after head coupler 210 has been inserted within tool coupler 220. In one implementation, transversally-mounted retention pins may also be spring loaded. Generally, retention system 430 may be required to prevent head coupler 210 in tool coupler 220 from separating when in an unloaded state (e.g., when forces are not being applied by ram 120). In a loaded state, the extension of ram 120 into cylindrical bore 302 would prevent cylindrical bore 302 and threaded bore 412 form becoming misaligned.

Figure 5:
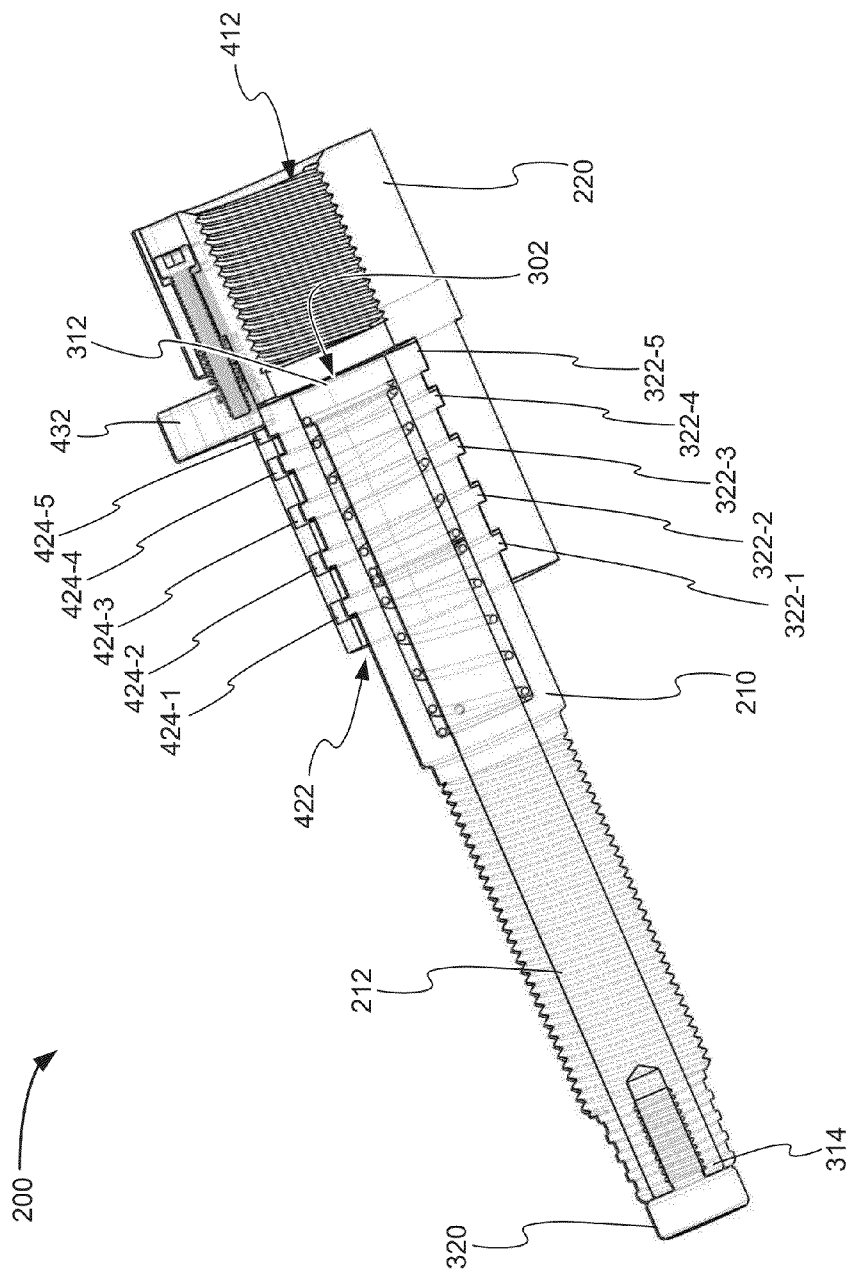
FIG. 5 provides a cross sectional view of the disconnect assembly of FIG. 2 in a coupled configuration.

FIG. 5 provides a cross section view of disconnect assembly 200 in a coupled configuration. As shown in FIG. 5, head coupler 210 is engaged within U-shaped channel 422 of tool coupler 220. U-shaped channel 422 and head coupler 210 may include corresponding indexing interfaces to ensure a proper connection and to prevent axial motion of head coupler 210 with respect to tool coupler 220. More particularly, each of grooves 424-1 through 424-5 may engage a corresponding protrusion ring 322-1 through 322-5 of head coupler 210. While the indexing interfaces shown in FIG. 5 are described in the context of rings 322 on head coupler 510 and grooves 424 on tool coupler 220, it other implementations, the indexing interface may include different configurations (e.g., rings on tool coupler 510 and grooves on head coupler 220). Cylindrical bore 302 aligns with threaded bore 412 such that ram 120 of hydraulic driver 100 (not shown in FIG. 5) may advance through first portion 304 of cylindrical bore 302 and into second portion 308 of cylindrical bore 302 to apply force to proximal end 312 of extension rod 212. Distal end 314 of extension rod 212 may extend out of the second portion 308 of cylindrical bore 302, causing end cap 320 to contact, for example, a wedge connector (not shown).

Figure 6:
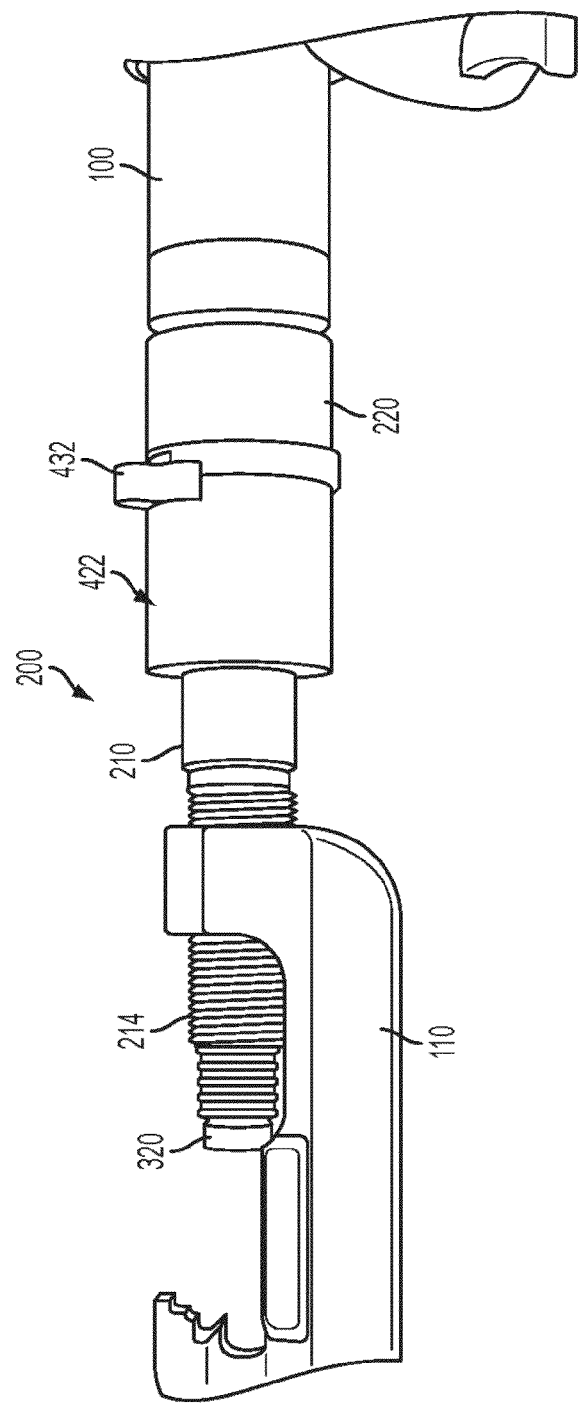
FIG. 6 provides a side view of the disconnect assembly of FIG. 2, in a coupled configuration, installed between the hydraulic tool and wedge frame of FIG. 1.

FIG. 6 provides an image of disconnect assembly 200 installed between hydraulic driver 100 and wedge frame 110. As shown in FIG. 6, spring-loaded latch 432 of retention system 430 locks head coupler 210 within U-shaped channel 422 of tool coupler 220 to prevent inadvertent disengagement of head coupler 210 and tool coupler 220. In one implementation, head coupler 210 may rotate (e.g., along the common axis shared by extension rod 212 and cylindrical bore 302) within U-shaped channel 422 of tool coupler 220. This rotation may allow, for example, simple adjustment of an orientation of wedge frame 110 when wedge frame 110 is threaded onto threaded section 214 of head coupler 210. For example, the depth of insertion of the threaded section 214 can be adjusted (e.g., to position end cap 320 in contact a wedge connector prior to activation of ram 120) when head coupler 210 is disconnected from tool coupler 220. Additionally, the depth of insertion of the threaded section 214 may be adjusted when head coupler is connected to tool coupler 220 without requiring rotation of hydraulic driver 100.

Figure 7:
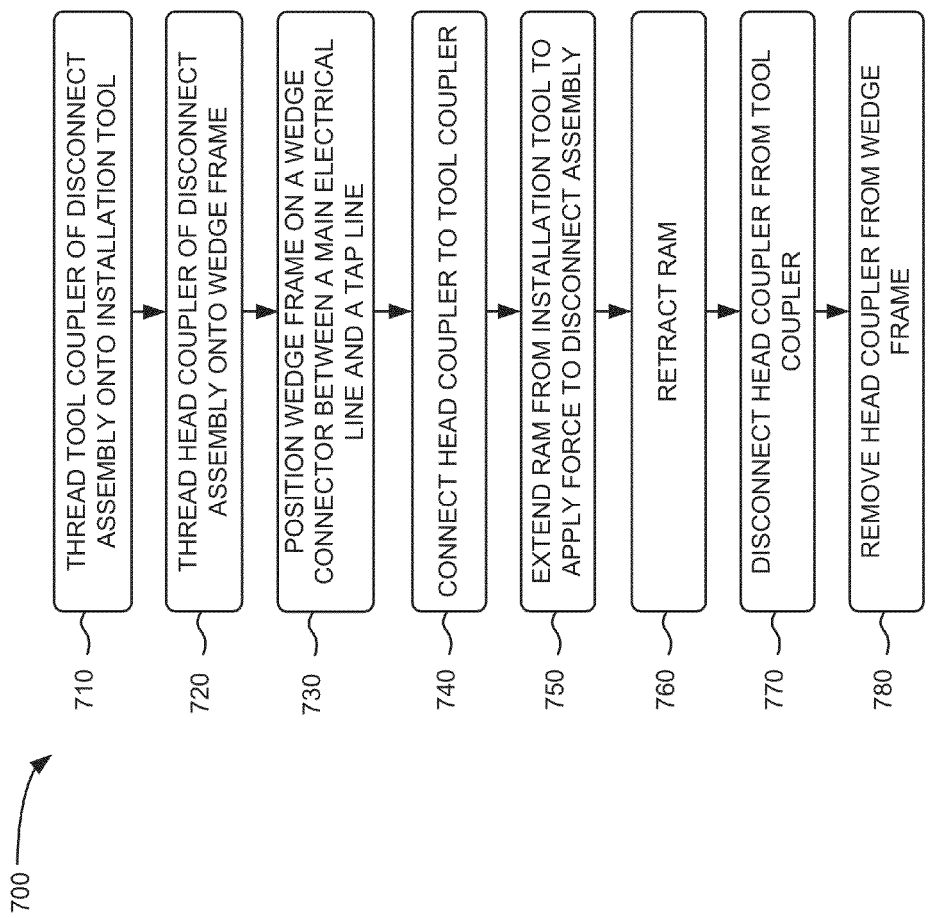
FIG. 7 is a flowchart of an exemplary process for installing a wedge connector using a hydraulic installation tool and a disconnect assembly, according to an implementation described herein.
Figure 8B:
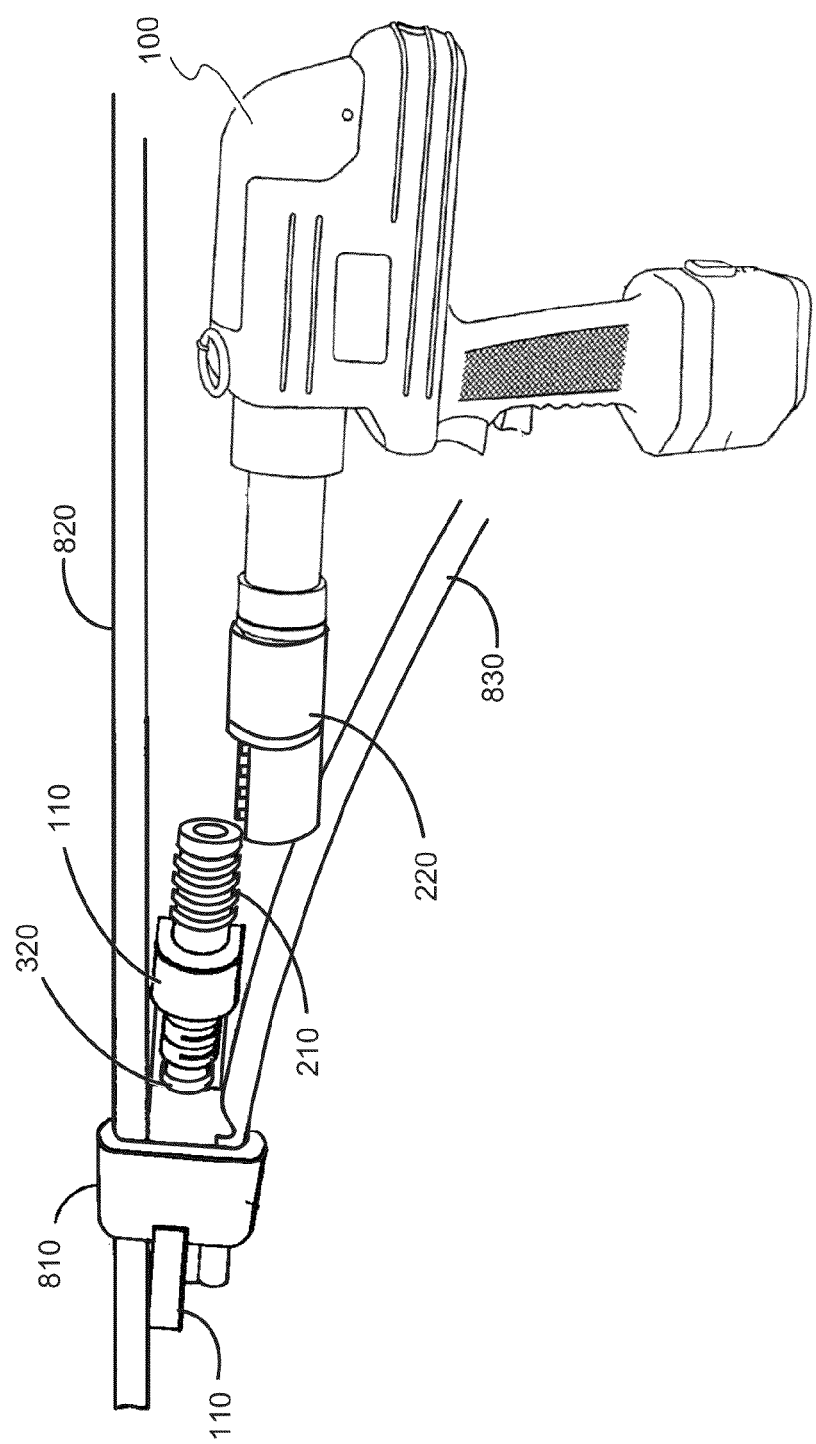

FIG. 7 is a flowchart of an exemplary process 700 for installing a wedge connector using a hydraulic installation tool and a disconnect assembly, according to an implementation described herein. Process 700 is described below with reference to FIGS. 8A-8C, which show isometric views of some of installation process 700. Process 700 may include threading a tool coupler of the disconnect assembly onto an installation tool (block 710). For example, as shown in FIG. 8B, tool coupler 220 of disconnect assembly 200 may be threaded onto hydraulic driver 100. Tool coupler 220 may engage with hydraulic driver 100 such that ram 120 (not visible in FIG. 8B) of hydraulic driver 100 will have a channel to extend through when activated. In one implementation, tool coupler 220 may be threaded (and/or otherwise secured) to hydraulic driver 100 as a vendor process and provided to a user as a pre-configured assembly.

Process 700 may further include threading a head coupler of a disconnect assembly onto a wedge frame (block 720) and positioning the wedge frame on a wedge connector between a main electrical line and a tap line (block 730). For example, as shown in FIG. 8A, head coupler 210 of a disconnect assembly 200 may be threaded into wedge frame 110. A wedge connector 810 may be positioned on a main electrical line 820 and a tap line 830. Wedge frame 110 may be positioned to engage wedge connector 810. Wedge frame 110 may be selected, for example, from multiple-sized wedge frames 110 (e.g., based on the cable size of electrical line 820 and tap line 830). Head coupler 210 may be threaded further into wedge frame 110 so that end cap 320 may engage wedge 810.

Process 700 may further include connecting the head coupler to the tool coupler (block 740). For example, as shown in FIG. 8C, tool coupler 220 may be mated with head coupler 210 to form single disconnect assembly 200. Retention system 430 may snap into place to prevent inadvertent separation of head coupler 210 from tool coupler 220.

Process 700 may also include extending a ram from the installation tool to apply force to a rod of the disconnect assembly block (750), and retracting the ram (block 760). For example, as shown in FIG. 8C, an operator may depress activation trigger 840 of hydraulic driver 100 to cause ram 120 to extend through tool coupler 220 and engage extension rod 212. Extension rod 212 may extend out of cylindrical bore 302 forcing end cap 320 to apply a force to wedge connector 810. After wedge connector 810 has been forced completely into position, an operator may depress retraction trigger 850 of hydraulic driver 100 to cause ram 120 to retract out of head coupler 210 and tool coupler 220.

Process 700 may further include disconnecting the head coupler from the tool coupler (block 770), and removing the head coupler from the wedge frame (block 780). For example, an operator may release retention system 430 to allow head coupler 210 and tool coupler 220 to be disconnected. Head coupler 210 may be unscrewed from wedge frame 110 in the event head coupler may need to be affixed to a different sized wedge frame 110 in the future.

According to implementations described herein, a disconnect assembly is provided to allow a wedge frame to be positioned and snug against a wedge prior to connecting the wedge frame to a hydraulic driver. In one implementation the disconnect assembly may include a head coupler portion and a tool coupler portion. The head coupler portion may include a threaded portion on a first part of an exterior surface to connect to a wedge frame, a longitudinal bore, a rod configured to slide longitudinally within the longitudinal bore, and a set of annular protrusions on a second part of the exterior surface. The tool coupler portion may include a threaded bore configured to mechanically attach the tool coupler portion to the tool, and a channel to receive a head coupler portion. The channel may include a set of grooves corresponding to the set of annular protrusions on the head coupler portion. When the head coupler portion is connected to the tool coupler portion, a ram from the hydraulic tool may engage the rod to apply force to an object in the wedge frame.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A disconnect assembly for a tool that drives a ram into a wedge frame, the disconnect assembly comprising:
   a head coupler portion, including:
      a threaded portion on a first part of an exterior surface to connect to the wedge frame,
      a longitudinal bore,
      a rod configured to slide longitudinally within the longitudinal bore, and
      a set of annular protrusions on a second part of the exterior surface; and
   a tool coupler portion including:
      a threaded bore configured to mechanically attach the tool coupler portion to the tool, and
      a U-shaped channel to receive a head coupler portion through an opening at a top of the U-shaped channel, wherein the U-shaped channel includes a set of grooves corresponding to the set of annular protrusions on the head coupler portion,
      wherein, when the head coupler portion is connected to the tool coupler portion, the ram engages the rod to apply force to an object in the wedge frame.

2. The disconnect assembly of claim 1, further comprising:
   a retention system to retain the head coupler portion within the U-shaped channel of the tool coupler portion.

3. The disconnect assembly of claim 2, wherein the retention system is automatically activated to retain the head coupler portion upon insertion of the head coupler portion within the tool coupler portion.

4. The disconnect assembly of claim 3, wherein the retention system is configured to require manual intervention to disengage the retention system.

5. The disconnect assembly of claim 1, wherein the head coupler portion is configured to be received by the tool coupler portion in any rotational orientation around an axis of the longitudinal bore.

6. The disconnect assembly of claim 1, wherein the set of grooves and the set of annular protrusions are mechanically indexed such that the head coupler portion can be inserted into the tool coupler portion only in a particular location within the U-shaped channel.

7. The disconnect assembly of claim 1, wherein the threaded portion of the head coupler portion is configured to be inserted into the wedge frame to an adjustable depth, and wherein a depth of insertion of the threaded portion can be adjusted when the head coupler portion is not connected to the tool coupler portion.

8. The disconnect assembly of claim 7, wherein the depth of insertion of the threaded portion can be adjusted when the head coupler portion is connected to the tool coupler portion and without rotating the tool.

9. The disconnect assembly of claim 1, wherein the force applied to the object in the wedge frame exceeds three tons.

10. The disconnect assembly of claim 1, wherein the second part of the exterior surface of the head coupler portion is substantially cylindrical.

11. A system, comprising:
a hydraulic drive tool including housing, a ram, and a wedge frame; and
a disconnect assembly interposed between the ram and the wedge frame, the disconnect assembly comprising:
a head coupler portion configured to be mechanically attached to the wedge frame, the head coupler portion including:
a longitudinal bore,
a rod configured to slide longitudinally within the longitudinal bore, and
a first indexing interface, and
a tool coupler portion configured to be mechanically secured to the housing, the tool coupler including a channel to removeably connect the head coupler portion to the tool coupler portion, wherein the channel includes a second indexing interface corresponding to the first indexing interface on the head coupler portion,
wherein, when the head coupler portion is connected to the tool coupler portion, the ram engages the rod to apply force to an object in the wedge frame.

12. The system of claim 11, wherein the tool coupler portion includes a threaded bore configured to mechanically attach to the housing.

13. The system of claim 11, wherein the first indexing interface includes one of:
a first set of protruding rings on an exterior surface of the head coupler portion, or
a first set of grooves on a part of the exterior surface of the head coupler portion; and
wherein the second indexing interface includes one of:
a second set of grooves configured to receive the first set of protruding rings, or
a second set of protruding rings configured to receive the first set of grooves.

14. The system of claim 11, wherein the disconnect assembly further includes:
a retention system to retain the head coupler portion within the channel of the tool coupler portion.

15. The system of claim 14, wherein the retention system is automatically activated to retain the head coupler portion upon insertion of the head coupler portion within the tool coupler portion, and wherein the retention system is configured to require manual intervention to disengage the retention system.

16. The system of claim 11, wherein the head coupler portion is configured to be attached to the wedge frame at an adjustable depth, and wherein a depth of attachment is adjustable when the head coupler portion is not connected to the tool coupler portion.

17. The system of claim 11, wherein the depth of attachment is configured to be adjusted when the head coupler portion is connected to the tool coupler portion without rotating the tool.

18. A disconnect assembly for a tool that drives a ram into a wedge frame, the disconnect assembly comprising:
a head coupler portion mechanically attached to the wedge frame, the head coupler portion including:
a longitudinal bore,
a rod configured to slide longitudinally within the longitudinal bore, and
a first indexing interface; and
a tool coupler portion mechanically secured to a housing, the tool coupler including a U-shaped channel to removeably connect the head coupler portion to the tool coupler portion, wherein the U-shaped channel includes an opening at a top of the U-shaped channel to receive the head coupler portion and a second indexing interface corresponding to the first indexing interface on the head coupler portion,
wherein, when the head coupler portion is connected to the tool coupler portion, the ram engages the rod to apply force to an object in the wedge frame.

19. The disconnect assembly of claim 18, wherein the tool coupler portion includes a threaded bore configured to mechanically attach to the housing.

20. The disconnect assembly of claim 18, further comprising:
a retention system to retain the head coupler portion within the U-shaped channel of the tool coupler portion.

* * * * *